United States Patent [19]

Kato et al.

[11] Patent Number: 4,573,572
[45] Date of Patent: Mar. 4, 1986

[54] RECORDING DISC CARTRIDGE

[75] Inventors: Yoshitake Kato, Ibaragi; Mitsuaki Naoi, Tokyo, both of Japan

[73] Assignees: Hitachi Maxell, Ltd.; Matsumi Electric Co., both of Tokyo, Japan

[21] Appl. No.: 643,355

[22] Filed: Aug. 22, 1984

[30] Foreign Application Priority Data

Aug. 24, 1983 [JP] Japan .................................. 58-155233

[51] Int. Cl.[4] ............................................. G11B 23/02
[52] U.S. Cl. ...................................... 206/303; 360/99; 360/132; 360/133
[58] Field of Search ............... 206/303, 310, 307, 309, 206/312, 403, 404, 408; 220/48, 4 E; 360/99, 133

[56] References Cited

U.S. PATENT DOCUMENTS

| | | | |
|---|---|---|---|
| 3,677,628 | 7/1972 | Walker | 360/132 X |
| 4,445,157 | 4/1984 | Takahashi | 360/99 X |
| 4,471,397 | 9/1984 | Cloutier | 360/133 |
| 4,497,009 | 1/1985 | Oishi et al. | 360/133 |

*Primary Examiner*—Steven M. Pollard
*Attorney, Agent, or Firm*—Birch, Stewart, Kolasch & Birch

[57] ABSTRACT

A recording disc cartridge comprising a disc case composed of a top case half and a bottom case half and a recording disc rotatably enclosed in the disc case, each of the top half and the bottom half being provided with at least one pair of connecting bosses in such a manner that the connecting bosses of one half are engageable with the corresponding connecting bosses of the other half and that the connecting bosses are disposed symmetrically relative to a phantom line passing the center of a head insertion hole and the center of a drive shaft insertion hole.

6 Claims, 10 Drawing Figures

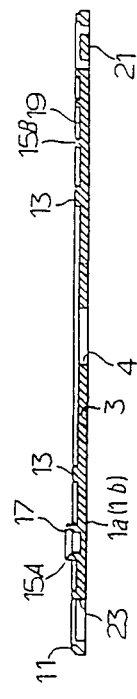
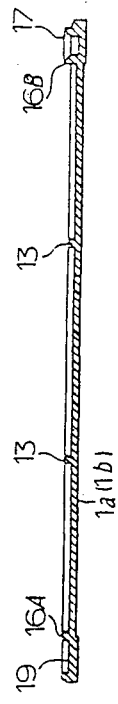
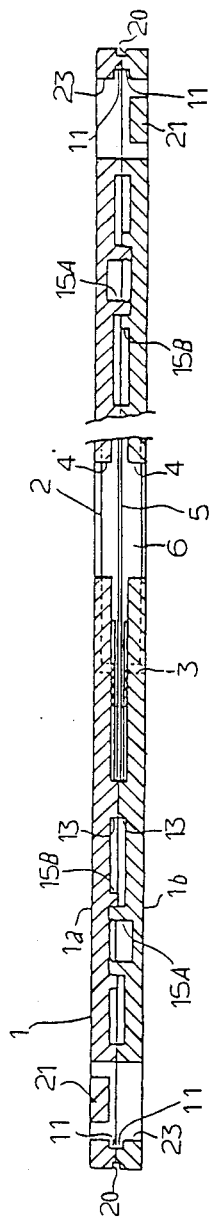
FIG. 3
FIG. 4
FIG. 7

RECORDING DISC CARTRIDGE

BACKGROUND OF THE INVENTION

The present invention relates to a recording disc cartridge including a magnetic recording disc or an optical recording disc enclosed in a disc case.

FIG. 1 shows a recording disc cartridge having a disc case 1 and a recording disc 2 rotatably enclosed in the disc case 1. In the recording disc cartridge of the above type, the disc case 1 is formed by a top case half 1a and a bottom case half 1b both of which are combined together by tapping screws or by an ultrasonic welding method. In the conventional recording disc cartridge, the top section 1a and the bottom section 1b are not shaped completely the same although they have almost similar shapes partly because they are fitted together by the engagement of projected walls formed on the peripheral part of one half of the disc case with recesses defined on the other half corresponding to the projected walls and partly because the detection notches on both of the halves are defined out of the center line of the disc case. Therefore, in the manufacturing process, two kinds of molds must be independently provided for each half and the top case and the bottom case half are independently molded and in turn each half thus formed must be assembled together one by one, thereby resulting in complicated work of assembling with expensive production cost in addition to a troublesome production control.

SUMMARY OF THE INVENTION

The essential object of the present invention is to provide a recording disc cartridge formed by a top section each section and a bottom section having completely a same shape so as to improve the productivity of the recording disc cartridge with a reduction in the production cost.

According to the present invention there is provided a recording disc cartridge which comprises a disc case compound of a top case half and a bottom case half each case half being provided with peripheral walls to complete the disc case, a drive shaft insertion hole defined at the central portion of the case and a head insertion hole defined at a portion apart from the drive shaft insertion hole in the frontward direction on the central portion of the disc case relative to the left and right direction. Each of the top case half and the bottom case half is provided with at least one pair of connecting bosses in such a manner that the connection bosses of one half of the case are engageable with the corresponding connecting bosses of the other case half and that the connecting bosses are disposed in a symmetrical relationship relative to a phantom line passing through the center of the head insertion hole and the center of the drive shaft insertion hole.

BRIEF EXPLANATION OF THE DRAWINGS

FIG. 3 is a cross sectional view taken along the lines A—A in FIG. 2, FIG. 4 is a cross sectional view taken along the lines B—B in FIG. 2, FIG. 7 is a cross sectional view of a recording disc cartridge formed by assembling the two half sections shown in FIG. 2 with the cross section taken along the lines A—A in FIG. 2.

DETAILED DESCRIPTION OF THE INVENTION

Figure 1:
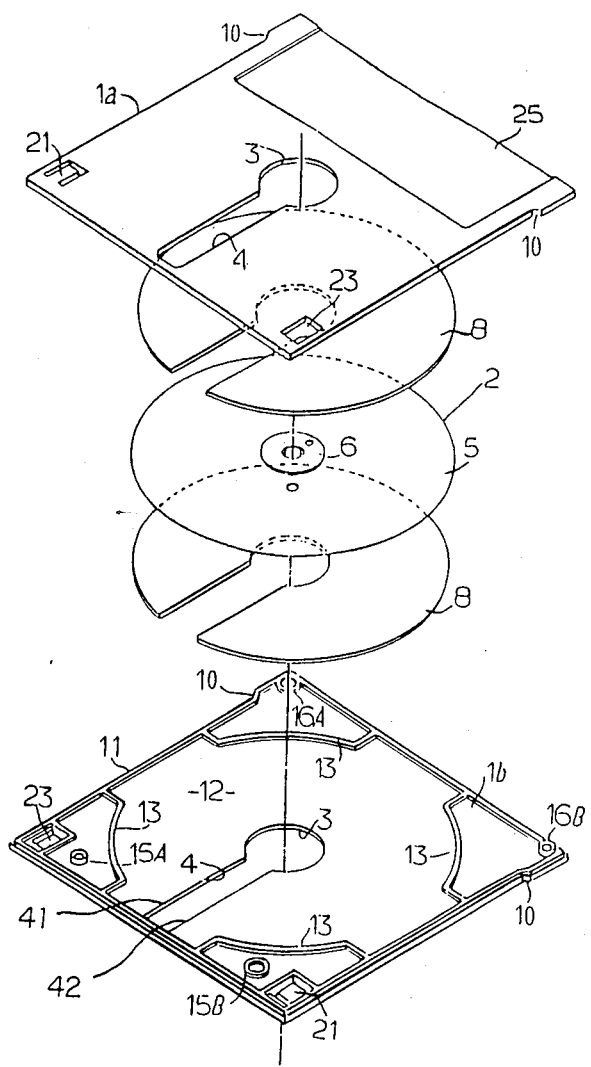
FIG. 1 is an exploded view showing one embodiment of a recording disc cartridge according to the present invention.

Before the description proceeds, it is noted that like parts are designated by like reference numerals throughout the attached drawings.

Referring to FIGS. 1 and 7, the recording disc cartridge of the first embodiment of the present invention comprises the disc case 1 having a generally flat rectangular shape in plan view and the magnetic or optical recording disc 2 rotatably accommodated in the disc case 1. The disc case 1 is composed of the top half case 1a and the bottom half case 1b each made of plastic resin, and formed generally as a flat plate with the four peripheral sides surrounded by low vertical peripheral walls 11. The top half of the case 1a and the bottom half of the case 1b are assembled together with the bottom face of the peripheral walls 11 of the top half of the case 1a abutted to the corresponding top face of the peripheral walls 11 of the bottom half of the case 1b so as to provide a flat space for accommodation of the recording disc 2. On the central portion of both the top and bottom halves 1a and 1b, there are defined a pair of drive shaft insertion holes 3 through both halves of the case with a pair of elongated head insertion holes 4 defined extending from the drive shaft insertion holes toward the front portion of the disc case 1.

The recording disc 2 is formed by a magnetic recording sheet 5 of an annular shape and a hub 6 fixed on the central part of the recording sheet 5 with the top end face and the bottom end face of the hub faced to the drive shaft insertion holes 3. Upon mounting of the recording disc cartridge on a disc drive apparatus, the recording disc 2 can be rotated by rotation of the disc drive members of the disc drive apparatus clamping the hub 6, so that the recording disc 2 slidingly rotates on the cleaning sheets 8 of non woven sheet laid on the inner surfaces of the top and bottom case halves 1a and 1b.

In the recording disc cartridge as mentioned above, the present invention is characterized in that the top case half 1a and the bottom case half 1b are completely the same shape.

The rear portions of the top case half 1a and the bottom half case 1b are provided with a pair of projected portions 10 extending symmetrically in the right and left directions and the rear portion of the case half is wider than the front portion of the case half for preventing erroneous mounting of the disc case 1 on the disc drive apparatus with the front side of the disc case wrongly taken as the rear side thereof.

The peripheral walls 11 are formed on the respective peripheral edges of each case half 1a and 1b and four arcuate shaped partition walls 13 are formed conforming to the outermost circle of the recording disc 2 at the respective corner portions of the disc case 1 so as to provide a disc receiving chamber 12. The lower faces of the respective walls 11 and 13 of the top case half 1a are contacted with the upper faces of the walls 11 and 13 of the bottom case half 1b upon assembling both halves.

In the respective halves 1a and 1b, each of the drive insertion holes 3 is piercingly defined in an annular shape at the central portion of the disc receiving chamber 12 with the head insertion hole 4 communicating with the drive shaft insertion hole 3 so as to extend toward the front portion of the disc case 1 in connection with the center in the lateral direction or left and right direction of the disc case 1. The peripheral edges 41 and 42 defining the head insertion hole 4 run parallel with, an equal distance to, a phantom line P (see FIG. 2) running in the longitudinal direction of the disc case 1 passing through the center of the drive shaft insertion hole 3 perpendicularly intersecting the front edge of the disc case 1. Since the head insertion hole 4 communicates with the drive shaft insertion hole 3 extending up to the inner edge of the peripheral wall 11, a possible stroke of the head of the disc drive apparatus can be explained so that the recording capacity of the disc cartridge can be increased. The center of the drive shaft insertion hole 3 must coincide with the center relative to the lateral direction of the disc case but it is not essential to define the center of the drive shaft insertion hole 3 at the center relative to the longitudinal direction of the disc case 1.

A plurality of connecting bosses 15A, 15B, 16A and 16B are projectingly formed on the inner surface of each of the halves 1a and 1b for connecting the top case half 1a and the bottom case half 1b. The bosses 15A and 15B situated at the rear portion of the disc case make one pair and the bosses 16A and 16B make another pair.

Figure 2:
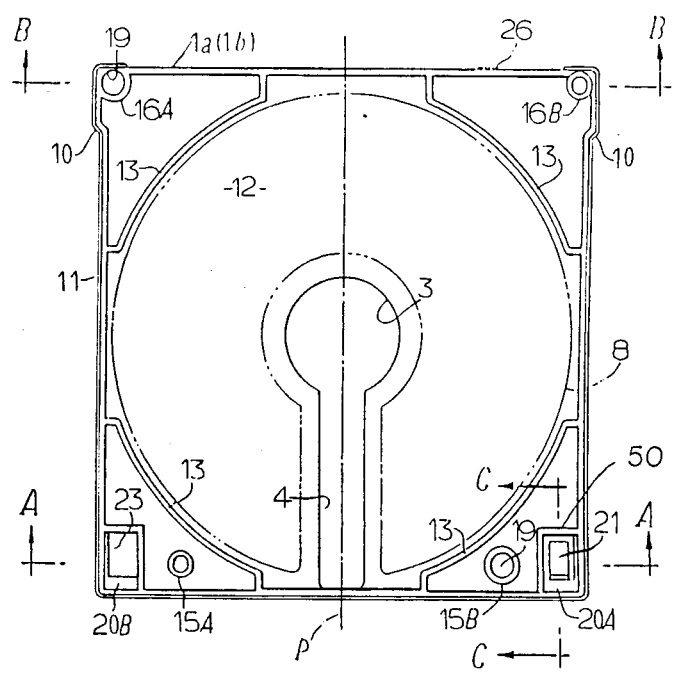
FIG. 2 is a top plan view showing a half section of the recording disc cartridge according to the present invention.

Referring to FIGS. 2 and 3, the left connecting boss 15A is a cylindrical column having a funnel shaped opening 17 at the top end portion and is taller than the top butting face of the peripheral wall 11 of the top case half 1a (or 1b). The right connecting boss 15B has a hole 19 engageable with the boss 15A of the other case half, the boss having a height equal to the top level of the peripheral wall 11. The connecting bosses 15A and 15B are disposed at a symmetrical position relative to the phantom line P.

Referring to FIGS. 2 and 4, the connecting bosses 16A and 16B are disposed at symmetrical position relative to the phantom line P similar to the connecting bosses 15A and 15B, and the connecting boss 16A has the same configuration of the connecting boss 15B having the hole 19 and the connecting boss 16B is formed in the same manner as the shape of the connecting boss 15A having the funnel shaped opening 17. It is noted that the connecting bosses 15A and 15B on the front side of both halves 1a and 1b are closely fitted whereas to the contrary, the connecting bosses 16A and 16B are loosely fitted.

A partition wall 50 is provided at the corner where the connecting boss 15B exists so as to provide a small chamber 20, wherein an erase preventing chip 21 is formed by cutting part of the half section in a U character shape. A shallow slot 22 is formed at the root of the chip 21 so as to facilitate manual separation of the chip 21 from the respective case half for preventing erasure of the record.

In FIG. 1, a shallow rectangular recess 25 is formed on the top face of the top half 1a for fitting a label and in FIG. 2, reference numeral 26 denotes a gate for injection of plastic resin when injection molding.

The top case half 1a and the bottom case half 1b are assembled together in such a manner as described below.

The cleaning liners 8 are laid in the inner surfaces of the disc receiving chamber 12 with the opening of the cleaning sheet 8 coinciding with the head insertion hole 4 and then secured by a thermal welding or a supersonic welding or adhering material. Subsequently the recording disc 2 is placed on the disc receiving chamber 12 of the bottom half 1b with the hub 6 opposed to the drive shaft insertion hole 3. Then the top half 1a to which the cleaning sheet was already secured is assembled to the bottom half 1b fitting the connecting bosses 15A and 15B situated at the front portion of both halves 1a and 1b, thereby positioning the disc between the halves 1a and 1b, and in turn the connecting bosses 16A and 16B situated at the rear portion of the halves 1a and 1b are fitted.

It is appreciated that according to the present invention, since the connecting bosses 15A, 15B, 16A and 16B are disposed symmetrically relative to the phantom center line P and the peripheral walls 11 and the partition walls 13 are also in the same relation, two case halves having exactly same configuration can be used for the top case half 1a and the bottom case half 1b for forming the case body 1.

Since the connecting bosses 16A and 16B on the rear portion of both halves 1a and 1b are fitted looser than the fitting between the connecting bosses 15A and 15B on the front portion of both halves 1a and 1b, in addition to the manner of engagement between the connecting bosses 16A and 16B on the rear portion of both halves 1a and 1b being inverse the the manner of engagement between the connecting bosses 15A and 15B on the front portion, the top case half 1a and the bottom case half 1b can be smoothly assembled with a high degree of accuracy preventing erroneous assembling wherein the two case halves are assembled in a reversed manner.

Figure 6:
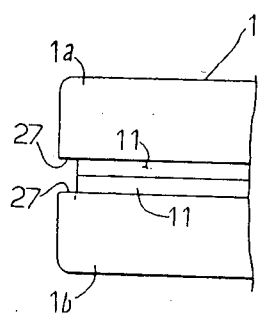
FIG. 6 is a partial enlarged side view in which two half sections are assembled together.
Figure 5:
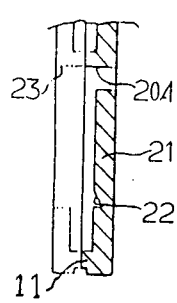
FIG. 5 is a cross sectional view taken along the lines C—C in FIG. 2.

By assembling the top half of the case 1a and the bottom half of the case 1b as described above, the top faces of the peripheral walls 11 and the partition walls 13 of the bottom section 1b closely contact the bottom faces of the corresponding walls in the top section 1a and the ends of the connecting bosses 15A and 16B of the top case half 1a contact the bottom faces of the holes 19 of the connecting bosses 15B and 16A of the bottom case half 1b, then both halves can be secured connected by an ultrasonic welding method. Since there are formed the funnel shaped openings 17 on the end portion of the connecting bosses 15A and 16B, the welding can be readily performed. In welding, if there is a partly butting portion on the ends of the walls 11 and 13, there may occur flash. To prevent this, the peripheral walls 11 are formed with the inner part thereof high and the outer part thereof to be downwardly stepped as shown by 27 in FIG. 6 so as to prevent the occurrence of the flash whereby both halves 1a and 1b can be secured between the butting faces of the peripheral walls 11.

The stepped portions 27 may be formed on the left and right peripheral walls, the front peripheral wall and the part of the rear peripheral wall adjacent to the connecting bosses 16A and 16B as shown in FIG. 2. However, such stepped portion 27 may be formed only the four corners of both halves adjacent to the connecting bosses.

The accuracy of the engagement of the connecting bosses 15A, 15B, 16A and 16B may be same. In this case, the top half case 1a should be assembled to the bottom case half 1b from directly above.

In the embodiment as described above, the distance between the two connecting bosses 15A and 15B in the front portion is different from the distance between the connecting bosses 16A and 16B for preventing erroneous assembling of both halves 1a and 1b, however, the value of the distance is not limited to the distance shown in this embodiment.

Figure 8:
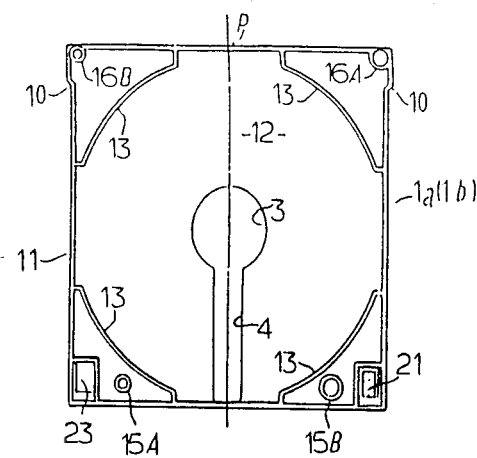
FIG. 8 is a plan view showing the inside of a second example of a half section of the recording disc cartridge according to the present invention.

The relation of the engagement of the connecting bosses 16A and 16B on the rear portion of the case halves 1a and 1b may be the same as the relation of the engagement between the connecting bosses 15A and 15B as shown in FIG. 8 so far as the engagement of the connecting bosses is performed by the engagement between the projection and the recess.

Figure 9:
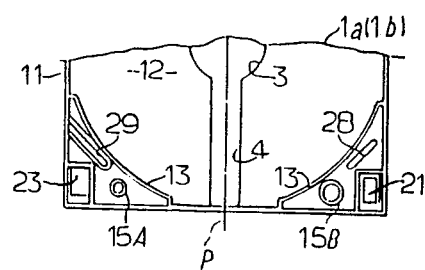
FIG. 9 is a partial plan view showing another example of a half section of the recording disc cartridge according to the present invention.

Furthermore, as shown in FIG. 9, there may be formed a rib like positioning projection 28 and a positioning slot 29 for engagement of the projection 28, so as to further assure the correct positioning of the top case half 1a and the bottom case half 1b. In a case where such projection and slot are formed for the positioning, the connecting bosses 15A, 15B, 16A and 16B may be provided only for connecting the top case half 1a and the bottom case half 1b by only abutting the ends of the respective connecting bosses without the fitting engagement.

Figure 10:
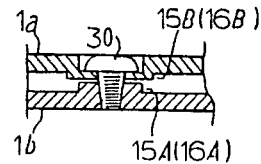
FIG. 10 is a partial cross sectional view showing an essential portion of securing two half sections used in the recording disc cartridge according to the present invention.

Furthermore, as shown in FIG. 10, the connecting bosses 15A through 16B on one of the case halves (for example 1a) are provided with through holes and the connecting bosses on the other case half (for example 1b) are formed with screw holes so that both case halves 1a and 1b can be connected by tapping screws tapped into the screw holes through the through holes.

The present invention can be applied to optical recording disc cartridges and/or recording disc cartridges having shutter means for opening and closing the head insertion hole 4.

It is appreciated that the recording disc cartridge according to the present invention can be manufactured by the same mold for the top half of the case and the bottom half of the case since they have a symmetrical configuration, thereby resulting in reducing the manufacturing cost.

It is also appreciated that in manufacturing the recording disc cartridge according to the present invention, the manufacturing process schedule can be simplified by commonly using only one kind of case half for the top case half and the bottom case half.

We claim:

1. A recording disc cartridge which comprises a disc case composed of a top case half and a bottom case half each half being provided with peripheral walls, a drive shaft insertion hole defined at the central portion of said disc case and a head insertion hole defined on a portion apart from said drive shaft insertion hole in a frontward direction at the central portion of the disc case relative to the left and right direction, each of said top half and bottom half of said disc case being provided with at least one pair of connecting bosses in such a manner that the connecting bosses of one half are engageable with the corresponding are disposed in symmetrical positions relative to a phantom line passing through the center of the head insertion hole and the center of the drive shaft insertion hole said head insertion hole communicating with said drive shaft insertion hole.

2. The recording disc cartridge according to claim 1, wherein said connecting bosses are formed of two pairs, with one pair situated on said front portion of the disc case and said other pair situated on the rear portion of the disc case.

3. The recording disc cartridge according to claim 2, wherein said connecting bosses situated on the front portion have a close fitting and the connecting bosses situated on the rear portion have a fitting looser than the fitting of the connecting bosses on the front portion.

4. The recording disc cartridge according to claim 3, wherein said connecting bosses are secured by a supersonic welding.

5. The recording disc cartridge according to claim 4, wherein portions of said peripheral walls are provided with stepped portion downwardly stepped outward.

6. The recording disc cartridge according to claim 1, wherein one of a pair of connecting bosses is a cylindrical boss having a height higher than the peripheral walls of the case half and the other connecting boss is defined with a hole in such a manner that when both case halves are assembled together, said hole of the one connecting boss of one of the case halves is engageable with the cylindrical boss formed on the other case half.

* * * * *

UNITED STATES PATENT AND TRADEMARK OFFICE
CERTIFICATE OF CORRECTION

PATENT NO. : 4,573,572

DATED : March 4, 1986

INVENTOR(S) : Kato et al

It is certified that error appears in the above-identified patent and that said Letters Patent is hereby corrected as shown below:

On the title page:
In category "[73] Assignees", please change "Matsumi Electric Co." to --Mitsumi Electric Company Ltd.--

Signed and Sealed this

Twenty-first Day of October, 1986

[SEAL]

*Attest:*

DONALD J. QUIGG

*Attesting Officer*     *Commissioner of Patents and Trademarks*